United States Patent [19]

Shinada

[11] Patent Number: 5,179,454
[45] Date of Patent: Jan. 12, 1993

[54] IMAGE READING APPARATUS

[75] Inventor: Yasuyuki Shinada, Yokohama, Japan

[73] Assignee: Canon Kabushiki Kaisha, Tokyo, Japan

[21] Appl. No.: 873,332

[22] Filed: Apr. 17, 1992

Related U.S. Application Data

[63] Continuation of Ser. No. 710,251, Jun. 3, 1991, abandoned, which is a continuation of Ser. No. 403,939, Sep. 7, 1989, abandoned.

[30] Foreign Application Priority Data

Sep. 12, 1988 [JP] Japan ................. 63-228034

[51] Int. Cl.$^5$ .................... H04N 1/40; H04N 1/04
[52] U.S. Cl. ................... 358/447; 358/498; 358/461; 355/234
[58] Field of Search ............... 382/50; 355/210, 230, 355/231, 233, 234, 235; 358/474, 475, 477, 486, 494, 496, 497, 498, 461, 447, 448, 449, 463, 443, 445

[56] References Cited

U.S. PATENT DOCUMENTS

| 4,439,790 | 3/1984 | Yoshida | 358/296 |
| 4,554,592 | 11/1985 | Hattori | 358/449 |
| 4,556,915 | 12/1985 | Shibata et al. | 382/44 |
| 4,717,963 | 1/1988 | Koizumi | 382/54 |
| 4,745,491 | 5/1988 | Kishi et al. | 358/300 |
| 4,766,404 | 8/1988 | Ishida et al. | 355/218 |
| 4,870,500 | 9/1989 | Nagashima | 358/443 |
| 4,870,501 | 9/1989 | Yoshida | 358/296 |

FOREIGN PATENT DOCUMENTS 0174570 9/1985 Japan.

Primary Examiner—Edward L. Coles, Sr.
Assistant Examiner—Jerome Grant, II
Attorney, Agent, or Firm—Fitzpatrick, Cella, Harper & Scinto

[57] ABSTRACT

An image reading apparatus includes a carrying unit for carrying a sheet original and a book original to a reading position, an original urging member including a reference member, closed when a sheet original is carried by the carrying unit and opened when a book original is carried by the carrying member, a reading unit for reading an image of an original carried to the reading position and the reference member of the original urging member in a closed state, and a correcting unit for correcting nonuniformity of an image signal obtained by reading an original image on the basis of a reference signal obtained by reading the reference number. When the original urging member is open, the correcting unit corrects nonuniformity of an image signal on the basis of the reference signal used upon reading of a previous original image.

13 Claims, 19 Drawing Sheets

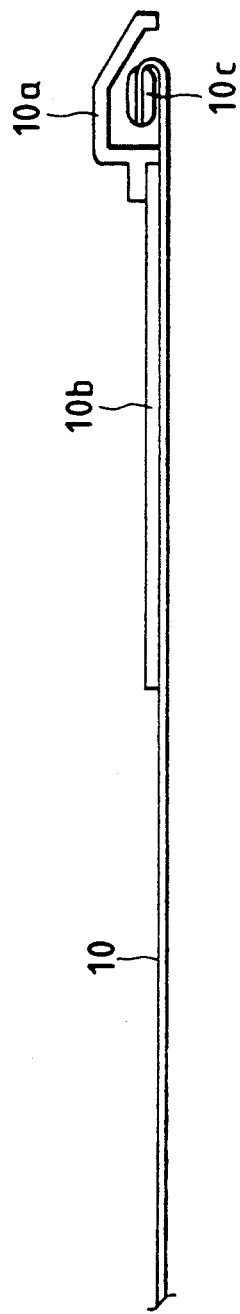
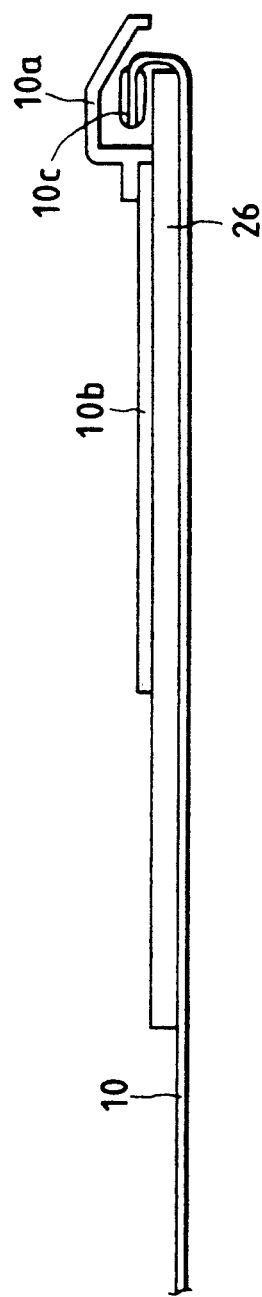
FIG. 11
FIG. 12

IMAGE READING APPARATUS

This application is a continuation of prior application Ser. No. 07/710,251, filed Jun. 3, 1991, now abandoned, which is a continuation of application Ser. No. 07/403,939, filed Sep. 7, 1989, which is now abandoned.

BACKGROUND OF THE INVENTION

1. Field of the Invention

The present invention relates to an image reading apparatus for photo-electrically reading an original image and, more particularly, to an image reading apparatus capable of reading an image of either a sheet original or a cubic original (book original) such as a book.

2. Description of the Related Art

A facsimile apparatus is known as an apparatus for photo-electrically reading an original image, electrically processing an image signal obtained by reading, and transmitting or recording the processed signal.

In such a facsimile apparatus, a sheet original such as a document or drawing is often processed. Therefore, in order to simplify a mechanical arrangement and to reduce the size of the apparatus, an image reading mechanism is generally arranged such that a sheet original is carried by rollers or the like and an image of the sheet original carried through a reading position is read by a line sensor such as a CCD.

It is, however, sometimes necessary to facsimile-transmit not only a sheet original but also an original (to be referred to as a book original hereinafter) having a thickness such as a book. In such a case, an operation must be performed in an order such that a book original is copied into the form of a sheet original and then subjected to a read operation by the reading unit of the facsimile apparatus.

When a large number of pages of a book are to be facsimile-transmitted, therefore, a large number of copies must be prepared, resulting in a cost- and time-consuming operation.

For this reason, an apparatus in which a book original can be read by a reading apparatus for a sheet original is proposed. That is, a sheet urging unit for sandwiching and carrying a sheet original is opened, and a book original having a thickness is moved on the sheet urging unit.

With this arrangement, since both sheet and book originals can be facsimile-transmitted by a single facsimile apparatus, time and cost problems can be solved.

In such an image photo-electrical reading apparatus, nonuniformity correction processing called shading correction is performed for an image signal. In order to perform this correction operation, a white reference plate arranged at a sheet original reading unit is read to measure a shading distortion.

When the sheet urging unit for a sheet original is opened in order to read not only a sheet original but also a book original, however, reading of the white reference plate cannot be performed. Therefore, measurement of the shading distortion for shading correction cannot be performed upon reading of a book original.

In addition, upon reading of a book original, an original end is read as black information and output as an unnecessary black signal. This reduces, e.g., a compression efficiency or storage efficiency.

SUMMARY OF THE INVENTION

The present invention has been made in consideration of the above situation and has as its object to provide an image reading apparatus capable of reading not only a sheet original but also a book original.

It is another object of the present invention to provide an image reading apparatus capable of correcting nonuniformity of a read image signal upon reading of either a sheet or book original.

It is still another object of the present invention to provide an image reading apparatus which does not output an unnecessary image signal even upon reading of a book original.

The above objects and effects and the other objects and effects of the present invention will become apparent from the following description.

BRIEF DESCRIPTION OF THE PREFERRED EMBODIMENTS

FIG. 11 is an enlarged side view of a carrying sheet;

FIG. 12 is a side view of a carrying sheet on which a book original is placed;

DETAILED DESCRIPTION OF THE PREFERRED EMBODIMENTS

Embodiments of the present invention will be described in detail below.

Figure 1:
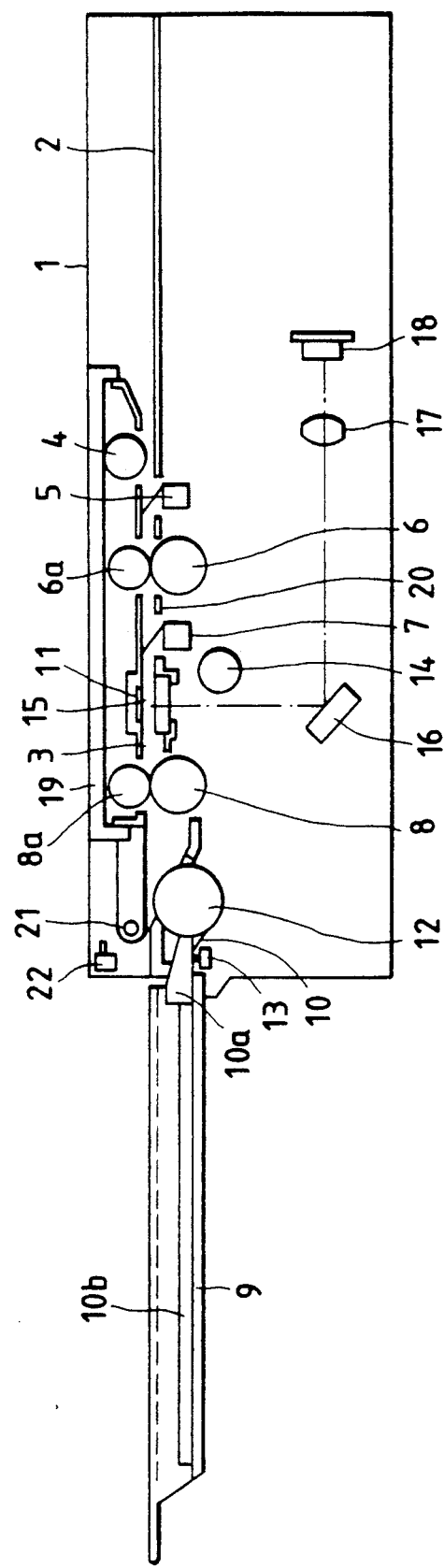
FIG. 1 is a view of an arrangement of an image reading apparatus according to an embodiment of the present invention.

FIG. 1 is a view of an arrangement according to an embodiment of the present invention, in which an apparatus is in a standby state. Referring to FIG. 1, an apparatus main body 1 has an original table 2, and a carrying path 3 for a sheet original is formed along an extension line of the original table 2. A pickup roller 4 for carrying a sheet original, a micro switch 5 which is activated by a small force and detects the presence/absence of a sheet original, a pair of carrying rollers 6 and 6a, a micro switch 7 which operates by a small force and detects leading and trailing ends of an original, a pair of carrying rollers 8 and 8a, and a discharge tray 9 for a sheet original are arranged from the upstream side of the carrying path 3. The positions of the micro switches 5 and 7 will be described later. An original urging member 10b for a cubic original and a handle 10a are mounted on the discharge tray 9, and a carrying sheet 10 can be extracted using the handle 10a. A predetermined amount of an end portion of the carrying sheet 10 opposite to an end portion near the handle 10a is wound around a takeup roller 12 and stored in the apparatus. A micro switch 13 detects a home position of the carrying sheet 10. The micro switch 13 is turned on by the handle 10a when the carrying sheet 10 is in a standby position (to be described later). A fluorescent lamp 14 is a light source for illuminating an original. The fluorescent lamp 14 radiates light on an original carried to a reading position 15, and reflected light from the original is input to a photo-electric conversion element 18 consisting of a plurality of light-receiving elements arranged in a line through a mirror 16 and a lens 17, thereby reading an original image in units of lines. A white reference plate 11 having a uniform white color is arranged at the reading position 15.

Figure 2:
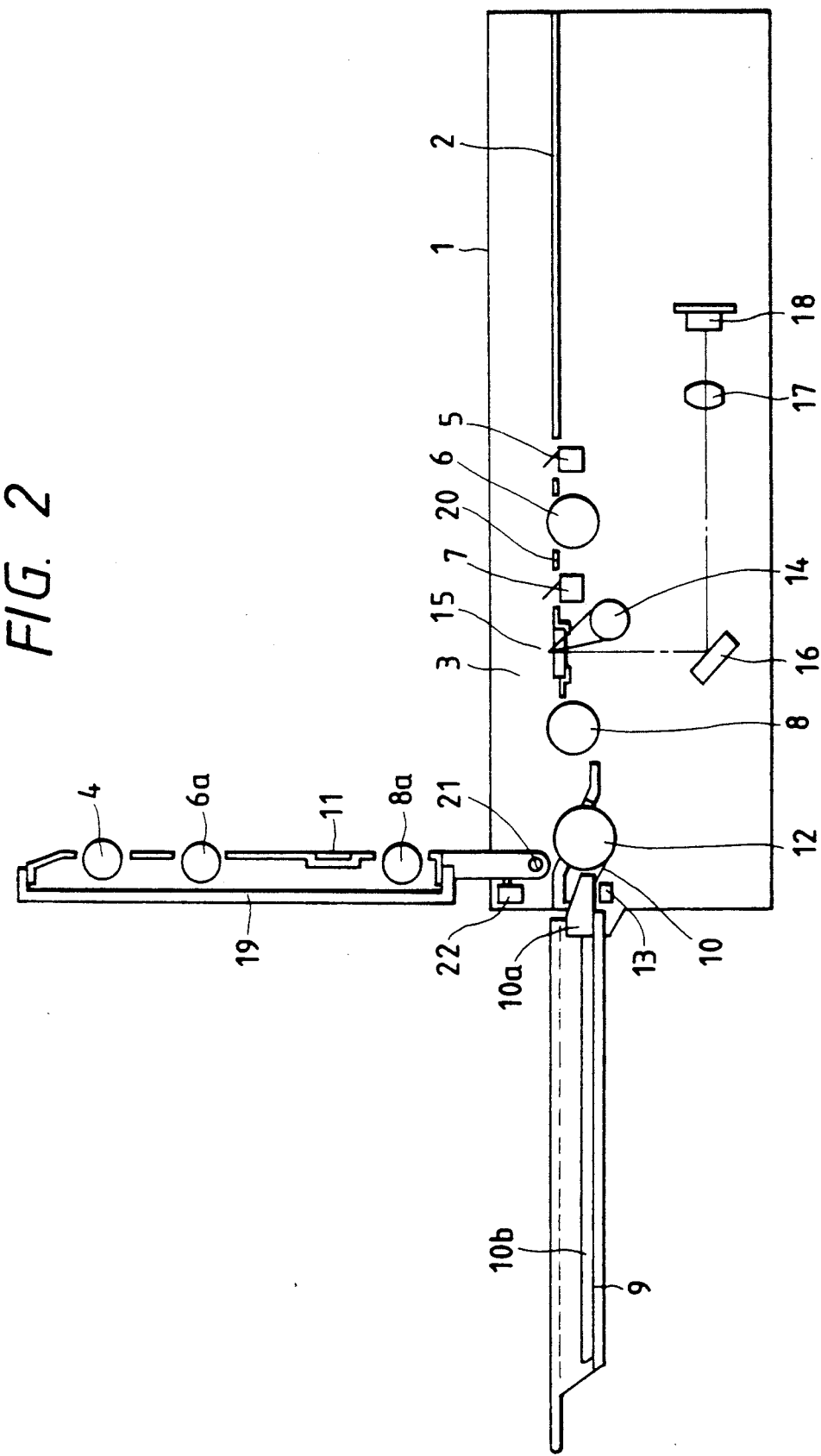
FIG. 2 is a view of an open state of a carrying path shown in FIG. 1.

The carrying path 3 is constituted by a guide unit 19 and a guide member 20, and can be opened upward at the original reading position 15. That is, the guide unit 19 is mounted to pivot about a support point 21 on the apparatus main body. When the carrying path 3 is opened, a micro switch 22 is turned on, thereby detecting opening of the carrying path 3. The above flexible carrying sheet 10 on which a cubic original is placed is carried on the opened carrying path 3. FIG. 2 shows a state in which the carrying path 3 is opened.

Figure 3:
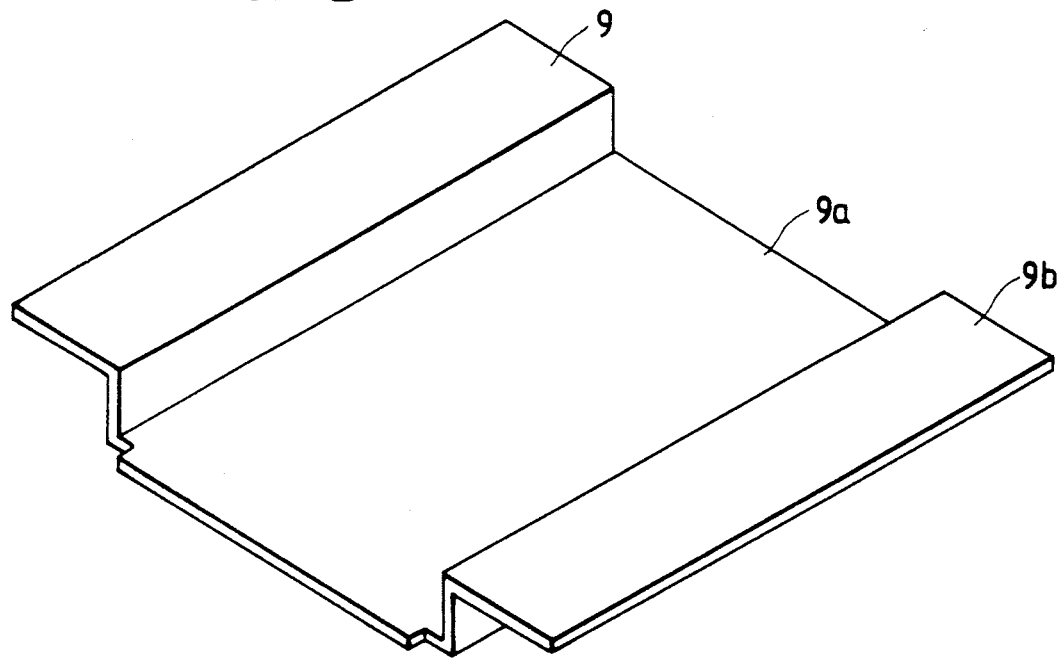
FIG. 3 is a perspective view of a discharge tray shown in FIG. 3.

A standby position of the carrying sheet 10 will be described below. FIG. 3 is a perspective view of the discharge tray 9 of this embodiment. Unlike a conventional tray, a storage portion 9a is formed in the discharge tray 9. The depth of the storage portion 9a is larger than the thickness of the handle 10a and its width is slightly larger than the handle 10a and the original urging member 10b. Therefore, as shown in FIG. 1, in the standby position, the handle 10a and the original urging member 10b are stored in the storage portion 9a so as not to interfere with carrying of a sheet original 23.

Control Circuit

Figure 4:
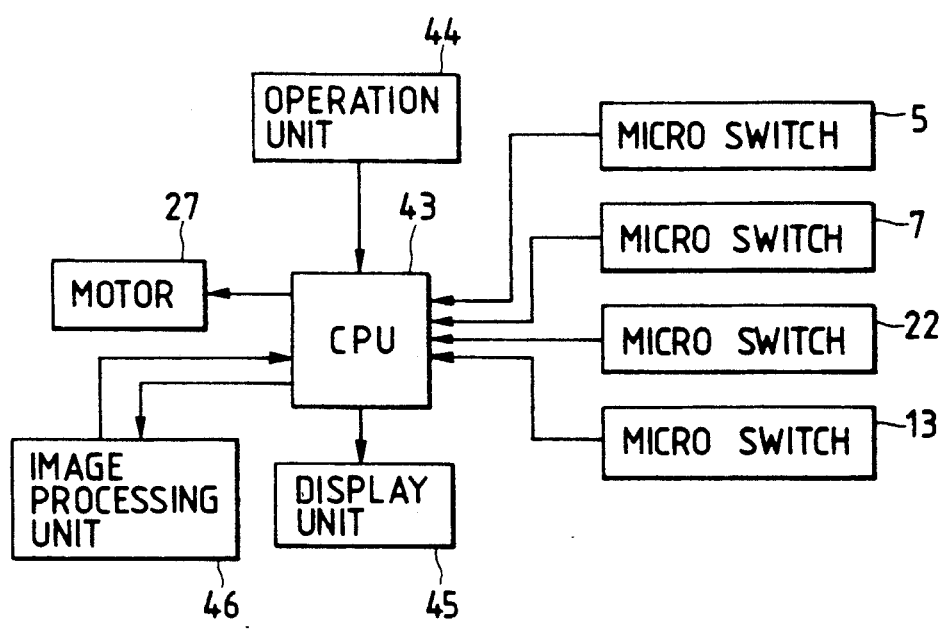
FIG. 4 is a block diagram of a control system.

FIG. 4 is a block diagram showing a control system of the image reading apparatus having the above arrangement of this embodiment. That is, a CPU (central processing unit) 43 controls a display unit 45, an image processing unit 46, and a motor 27 (to be described later) in accordance with an operation instruction signal from an operation unit 44 or input signals from the micro switches 5, 7, 13, and 22.

Figure 6:
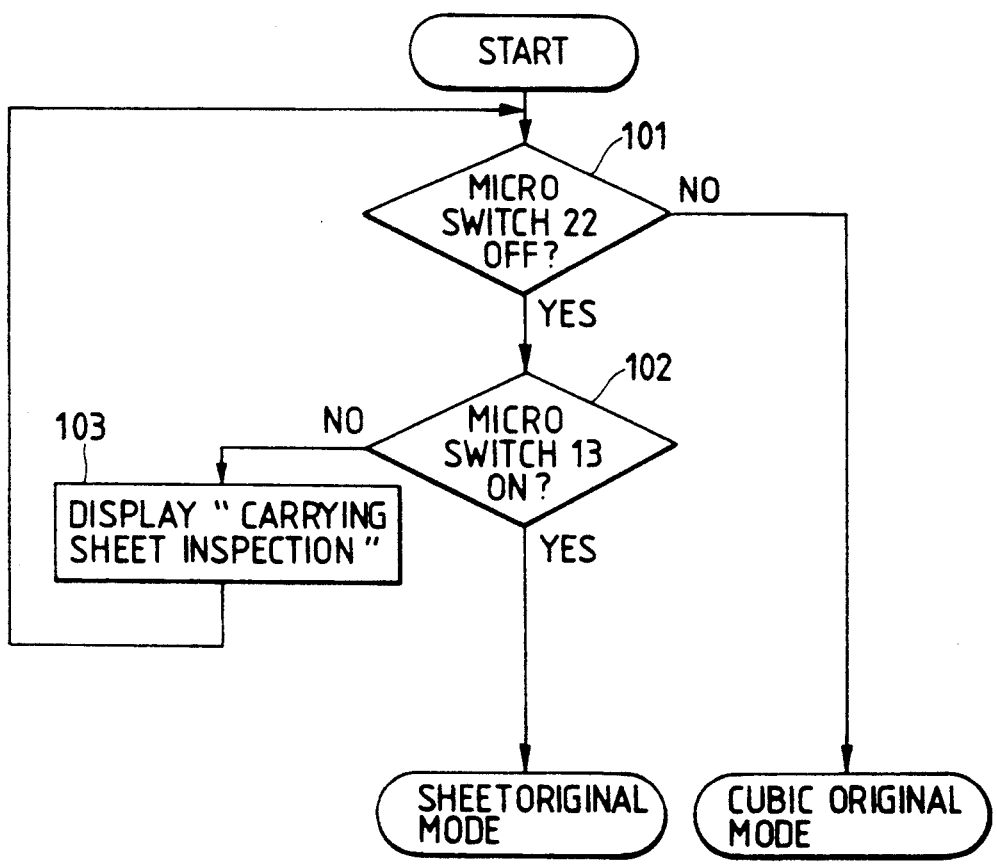
FIG. 6 is a flow chart of a mode determination operation.
Figure 7:
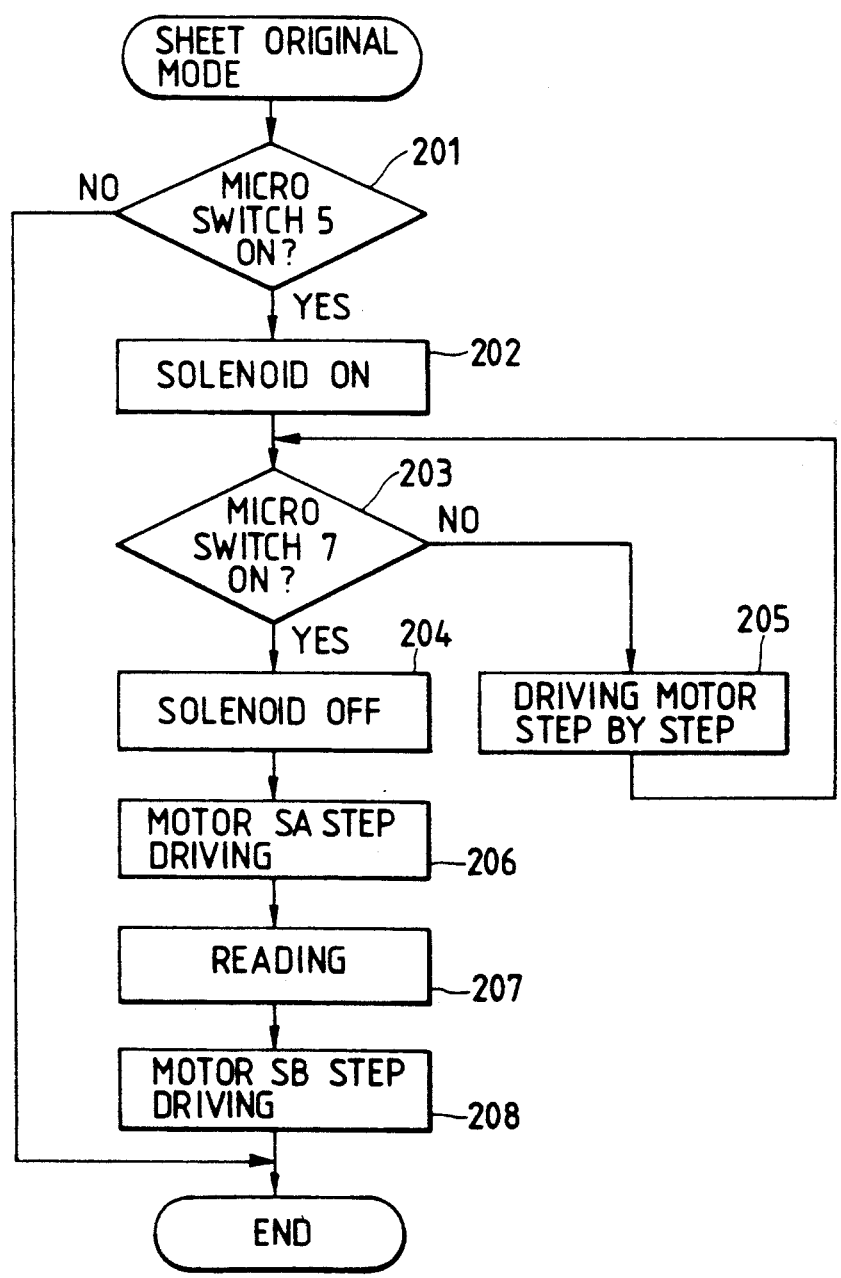
FIG. 7 is a flow chart of a sheet original mode read operation.
Figure 8:
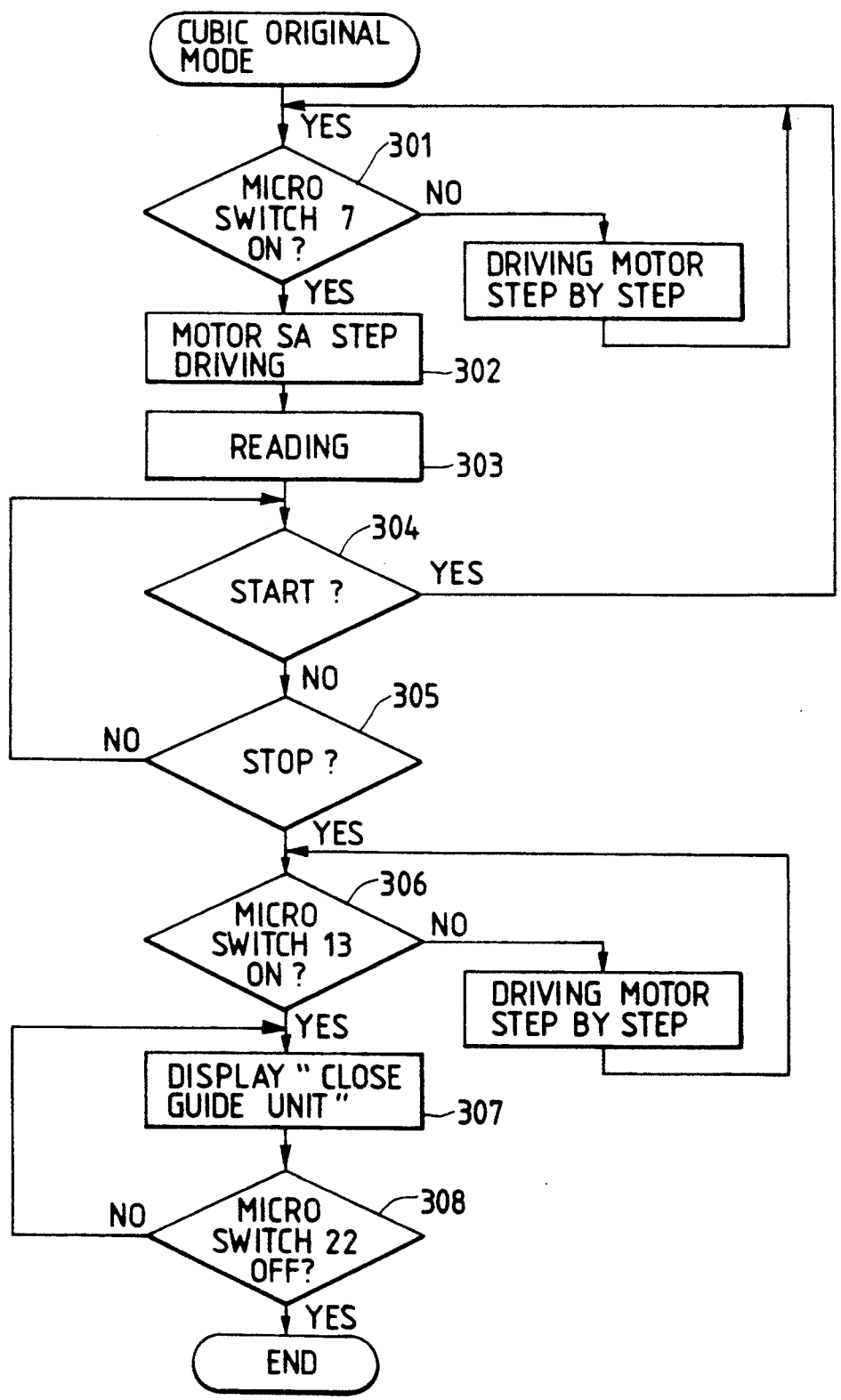
FIG. 8 is a flow chart of a read operation performed in a book original mode.

FIGS. 6 to 8 are flow charts showing control programs for operation control stored in a memory ROM in the CPU 43.

Figure 5:
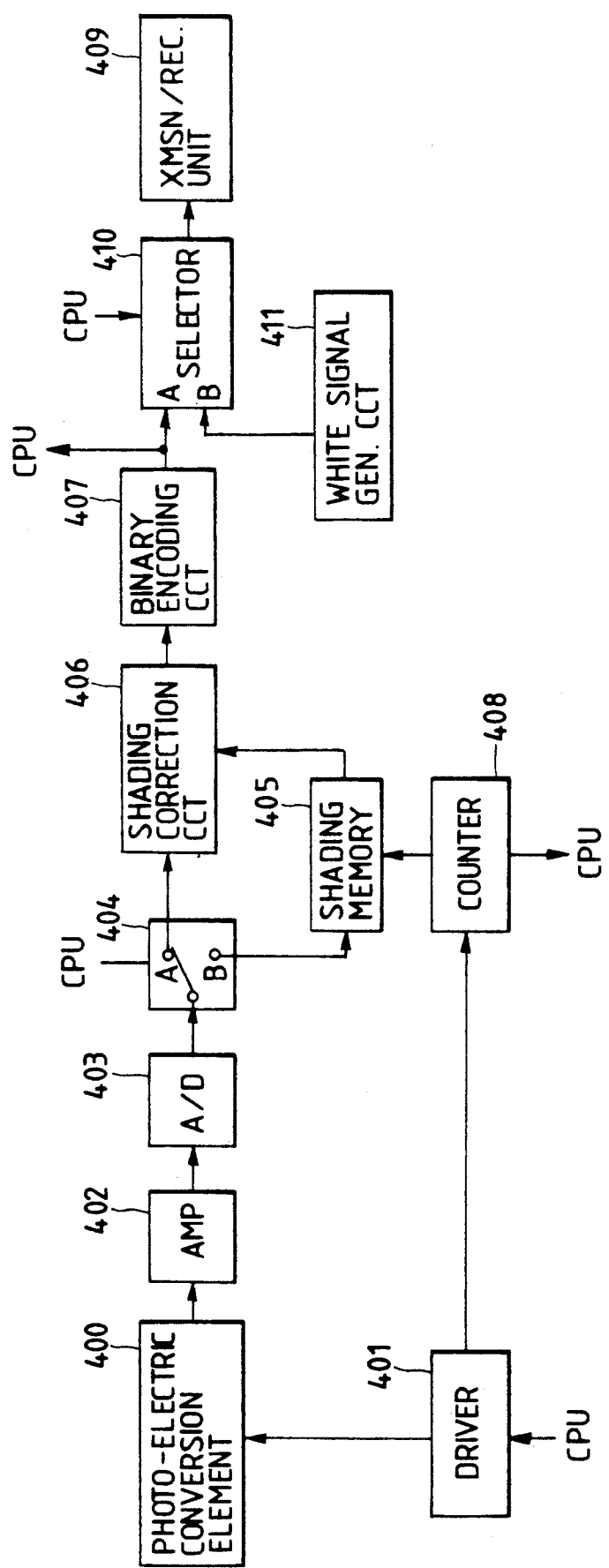
FIG. 5 is a block diagram of an image processing unit.

FIG. 5 is a block diagram showing an arrangement of the image processing unit 46 for processing a read image signal.

Referring to FIG. 5, the image processing unit 46 includes a photo-electric conversion element 400, corresponding to the photo-electric conversion element 18 shown in FIG. 1, such as a CCD line sensor consisting of a plurality of light-receiving elements arranged in line. The photo-electric conversion element 400 operates in accordance with a signal from a driver 401 for generating various timing signals in response to a command from the CPU 43 and serially outputs an analog image signal of one line. The output analog image signal is amplified to a predetermined level by an amplifier 402 and converted into a digital image signal of a predetermined number of bits in units of pixels by an analog/digital (A/D) converter 403.

A shading memory 405 stores, as correction data, a digital image signal of one line for shading correction obtained by reading a white reference plate 11 by the photo-electric conversion element 400. An image signal corresponding to the white reference plate 11 is stored, via a switch circuit 404 operated by the CPU 43, in the shading memory 405 in accordance with an address supplied from a counter 408 which performs a count operation in response to a timing signal from the driver 401.

A shading correction circuit 406 electrically corrects a shading distortion of an image signal obtained by reading an original image by the photo-electric conversion element 400. That is, the shading correction circuit 406 corrects the shading distortion of an image signal on the basis of correction data read out from the shading memory 405 in accordance with an address from the counter 408 in synchronism with reading of an original image.

Note that the address information from the counter 408 is also transmitted to the CPU 43. The CPU determines an image reading position by the photo-electric conversion element 400 on the basis of the address information.

A binary encoding circuit 407 compares the image signal subjected to shading correction by the shading correction circuit 406 with a predetermined threshold value to binary-encode the image signal, thereby forming a binary image signal representing the black and white levels of the image.

The binary image signal from the binary encoding circuit 407 is also supplied to the CPU 43. The CPU 43 determines an original end on the basis of a level change of the binary image signal.

A white signal generating circuit 411 generates a white signal which is a binary image signal representing a white image. A selector 410 selects one of the binary image signal from the binary encoding circuit 407 and the white signal from the white signal generating circuit 411 and outputs the selected signal to a transmission/recording unit 409.

The transmission/recording unit 409 performs compression encoding for the input binary image signal and, if necessary, transmits the signal via a telephone line. In addition, the transmitting/recording unit 409 supplies the binary image signal to a printer to record an image on a recording medium.

The operation of the image reading apparatus having the above arrangement will be described below.

Figure 9:
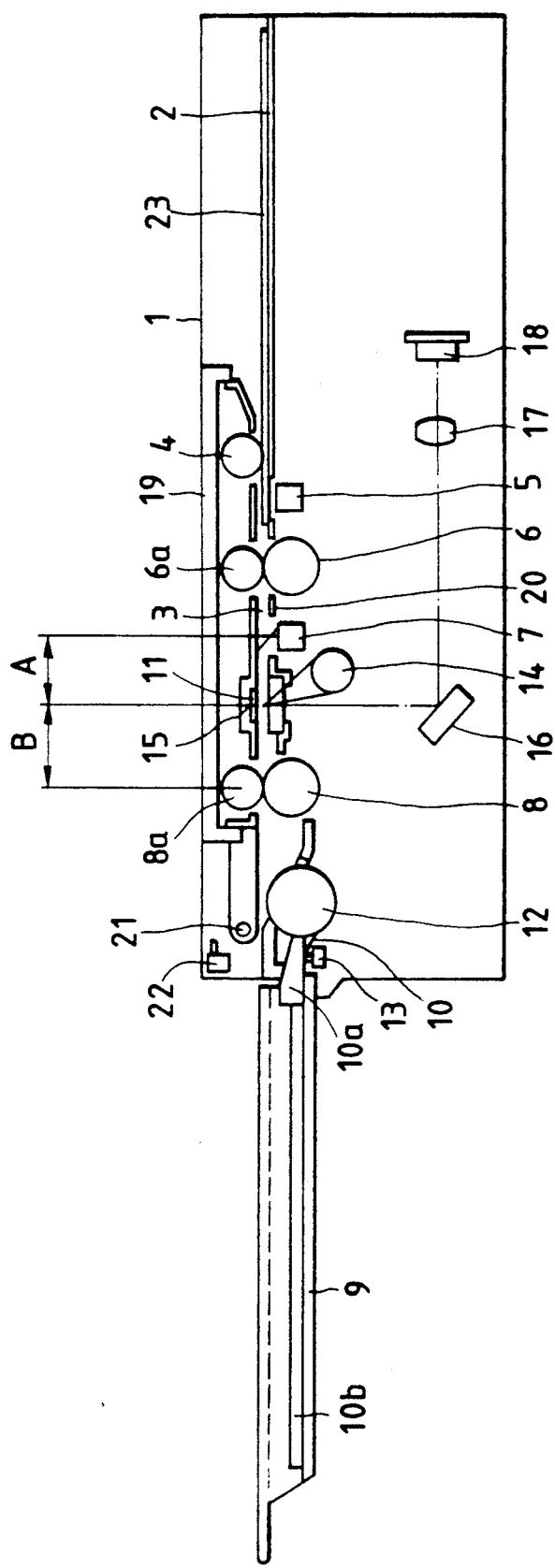
FIG. 9 is a view for explaining how to set a sheet original.

A read operation performed when an original is a sheet original having a small thickness will be described. FIG. 9 is a view for explaining how to set a sheet original. As shown in FIG. 9, when the sheet original 23 is placed on the original table 2 and a start switch arranged on the operation unit 44 is operated with the guide unit 19 closed, i.e., with the carrying path 3 closed, a mode determination operation shown in a flow chart of FIG. 6 is performed. That is, a state of the micro switch 22 is checked at the start (step 101, the micro switch 22 is OFF because the guide unit 19 is closed). The CPU 43 then checks in accordance with a signal from the micro switch 13 whether the carrying sheet 10 is in a predetermined standby position. If the carrying sheet 10 is in the standby position, the micro switch 13 is turned on (step 102). If the carrying sheet 10 is not in the predetermined position, the sheet original 23 may cause jamming (paper jamming). Therefore, "carrying sheet 10 inspection" is displayed for an operator on a display or the like of the display unit 45 (step 103).

Thereafter, a sheet original mode read operation shown in a flow chart of FIG. 7 is performed. If the micro switch 22 is ON at the start of the flow, a cubic original mode is selected.

When mode determination is performed as described above and the sheet original mode is determined, the operation flow shown in FIG. 7 is executed. In this flow, the micro switch 5 detects the presence/absence of the sheet original 23. If the micro switch 5 detects the sheet original 23 (step 201), a solenoid (not shown) is turned on (step 202), and the pickup roller 4 is urged against the sheet original 23, thereby carrying the sheet original 23 to the left in FIG. 9. When the leading end of the sheet original 23 is clamped between the carrying rollers 6 and 6a and the micro switch 7 detects the sheet original 23 (step 203), the above solenoid is turned off (step 204), and urging of the pickup roller 4 is released. If the micro switch 7 does not detect the sheet original 23, the motor is driven step by step until the sheet original 23 is detected (step 205).

When the solenoid is turned off to release urging of the pickup roller 4, SA step driving of the motor is performed (step 206) to carry the sheet original 23 by a distance A (see FIG. 9) from the micro switch 7 to the reading position 15. When the leading end of the sheet original 23 reaches the reading position 15, reading of an original image is started (step 207). That is, the fluorescent lamp 14 illuminates the sheet original, reflected light from the sheet original is imaged on the photoelectric conversion element 18 via the mirror 16 and the lens 17, and an image is converted into an electrical signal in units of lines using the photo-electric conversion element 18. Thereafter, when the trailing end of the sheet original 23 reaches the reading position 15 to end reading, the motor is driven by the number of steps SB corresponding to a distance B (see FIG. 9) from the reading position 15 to the carrying rollers 8 and 8a (step 208), thereby discharging the sheet original 23 on the original urging member 10b in the tray 9. The read operation for the sheet original 23 is thus ended.

Figure 10:
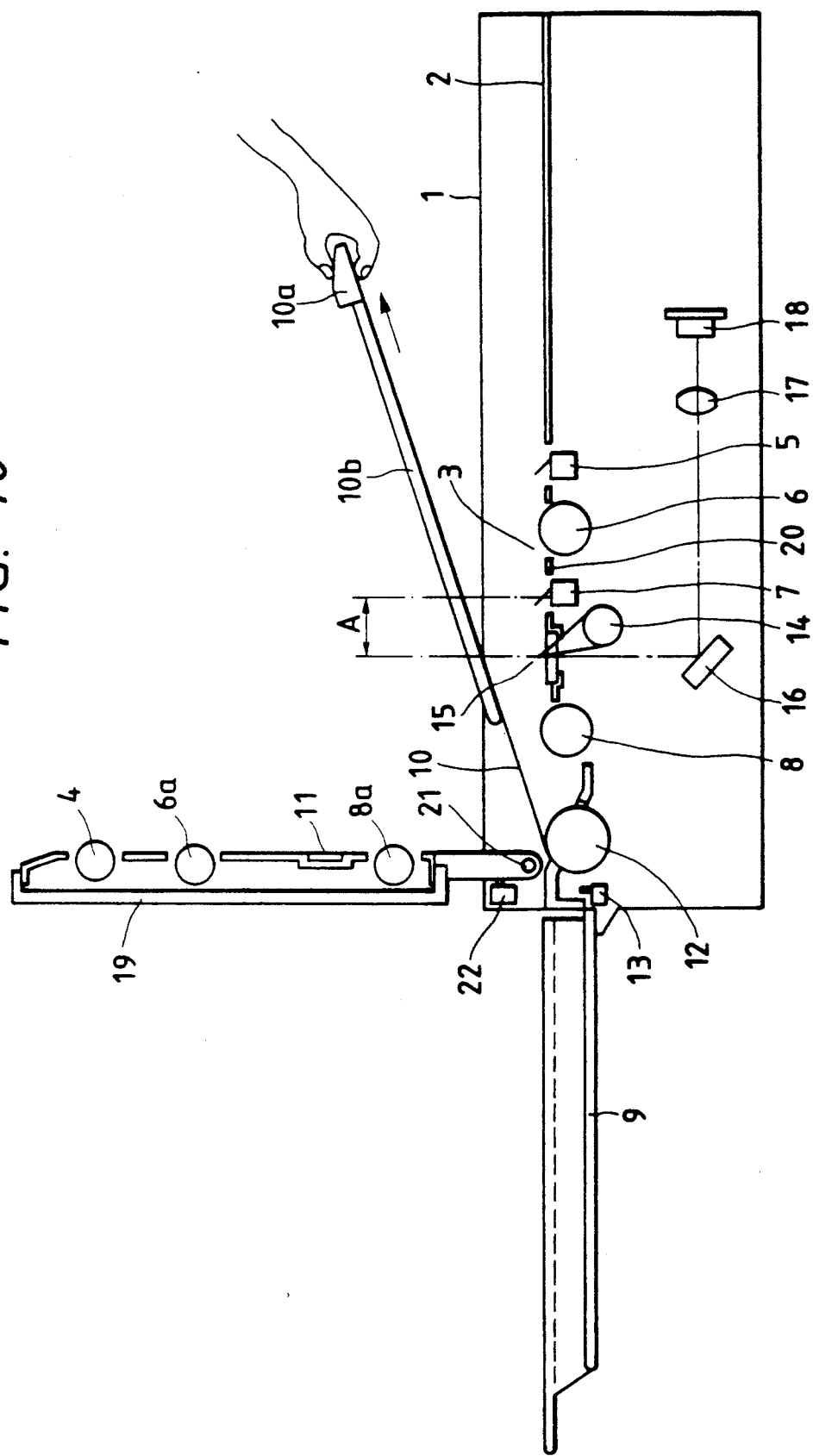
FIG. 10 is a view for explaining how to set a book original.

A read operation performed when an original is a cubic original having a large thickness will be described below. In this case, an operator first opens the guide unit 19 upward to open the carrying path 3 as shown in FIG. 10 and operates the handle 10a to extract the carrying sheet 10 in a direction indicated by an arrow in FIG. 10.

FIG. 11 is an enlarged side view of the carrying sheet 10 on which a cubic original 26 is not placed, i.e., the carrying sheet 10 in a standby state. The carrying sheet 10 is made of a transparent film having flexibility such as a polyester sheet and has a width W (see FIG. 14) smaller than a width of an expected smallest original. For this reason, when a cubic original is read, the carrying sheet 10 has regions transmitting and not transmitting reflected light from the original. Therefore, transparency of the material of the carrying sheet 10 is preferably as high as possible.

Figure 13:
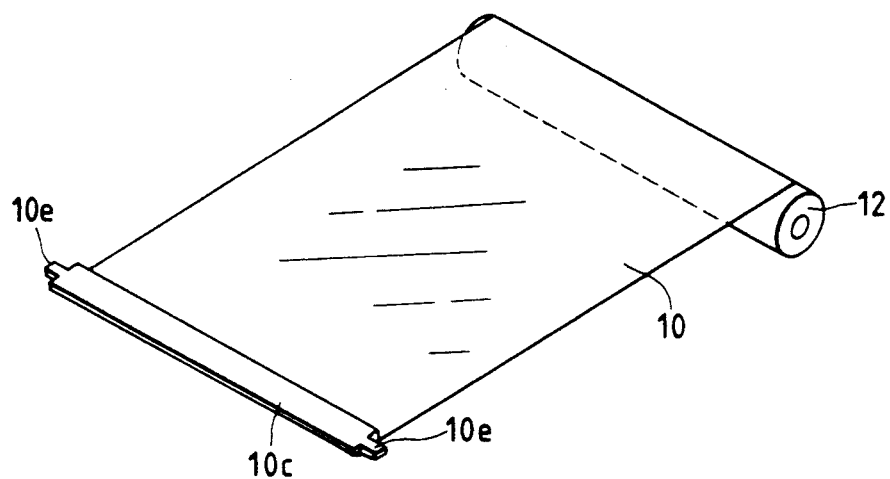
FIG. 13 is a perspective view of a replacing carrying sheet assembly.

FIG. 13 is a perspective view of a replacing carrying sheet assembly (including the takeup roller 12 and a support member 10c). One end of the carrying sheet 10 is fixed to the takeup roller 12 and its other end is fixed to the support member 10c. On the apparatus main body on which the support member 10c is mounted, the support member 10c is fixed to the handle 10a (FIG. 10) such that projecting portions 10e at both ends of the support member 10c are fitted in holes 10d (see FIG. 14) at both end portions of the handle 10a. The takeup roller 12 is connected to a driving system of the apparatus main body as will be described later with reference to FIG. 15. The original urging member 10b (FIG. 11) must have some weight and flexibility and preferably consists of rubber or the like.

Figure 14:
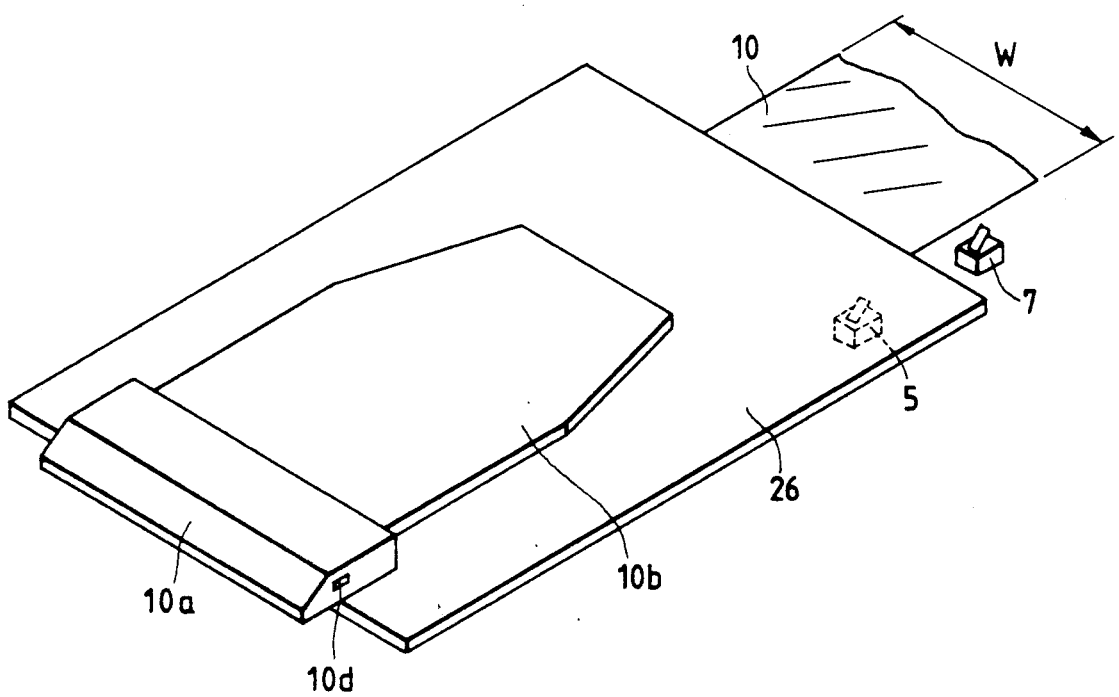
FIG. 14 is a perspective view of a carrying sheet.

FIG. 12 is a side view showing a state in which the cubic original 26 is placed on the carrying sheet 10, and FIG. 14 is a perspective view thereof. In order to set the cubic original 26, the carrying sheet 10 is extracted by the handle 10a, the free end of the original urging member 10b is raised, the cubic original 26 is sandwiched between the original urging member 10b and the carrying sheet 10 to abut against the handle 10a, and then the free end of the original urging member 10b is released. As a result, the cubic original 26 is urged by the weight of the original urging member 10b, thereby ending the setting operation.

Figure 15:
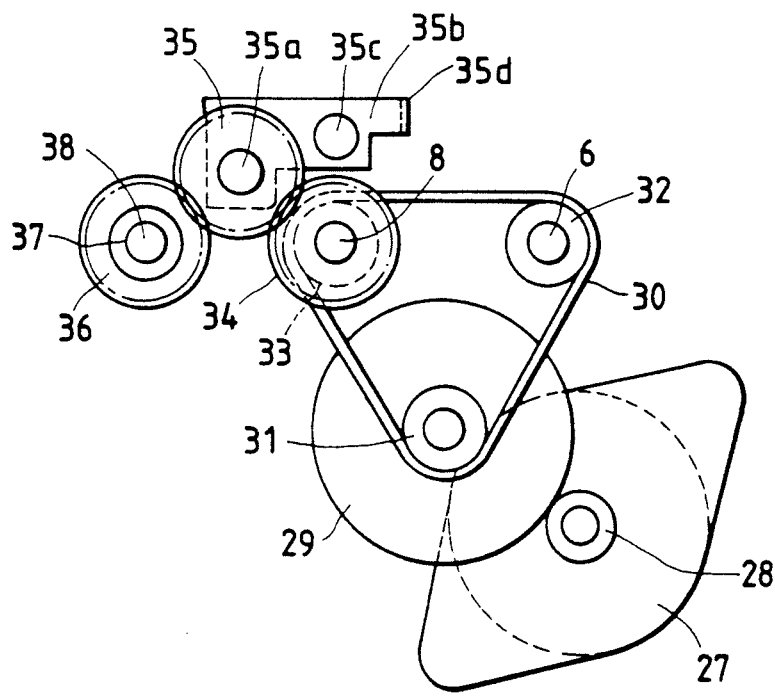
FIGS. 15 and 16 are views of arrangements of a carrying sheet driving/speed reducing system in a book original mode and a sheet original mode, respectively.

An arrangement/operation of the driving system for the carrying sheet 10 and the like will sent be described. FIG. 15 shows an arrangement of the driving/speed reducing system viewed in the axial direction. In this arrangement, power is transmitted from the motor 27 as a driving source to the carrying rollers 6 and 8 via gears 28 and 29, a belt 30, and pulleys 31, 32, and 33. A driving force from the carrying rollers 6 and 8 is transmitted to a gear 36 for driving the takeup roller 12 via a gear 34 and an idler gear 35. The idler gear 35 is arranged to be rotatable about an idler shaft 35a fixed on an idler plate 35b which can pivot about a pivot center 35c.

In the cubic original mode, the idler plate 35b pivots about the pivot center 35c by its weight, and the idler gear 35 meshes with the gears 34 and 36. The gear 36 is formed integrally with a torque limiter 37, and a takeup shaft 38 for driving the takeup roller is fitted in the torque limiter 37. Therefore, a driving force of the motor 27 is transmitted to the takeup shaft 38.

A transmission torque of the torque limiter 37 is a torque capable of carrying an expected heaviest cubic original 26. In this case, if the torque limiter 37 is not provided and the takeup shaft 38 and the gear 36 are directly connected, an operator cannot extract the carrying sheet 10. Therefore, driving sources must be independently provided for both the sheet and cubic originals. In this embodiment, however, the torque limiter 37 is located between the motor 27 as a driving source and the takeup roller 12. Therefore, both the sheet and cubic originals can be carried without providing two driving sources. In addition, an operator can extract the carrying sheet 10 with a small force.

In the above embodiment, the torque limiter 37 is used as a transmission torque limiting means. In addition to the torque limiter, however, other known means such as a sleeve with a cam, a magnetic fluid coupling, and a fluid coupling may be used.

Figure 16:
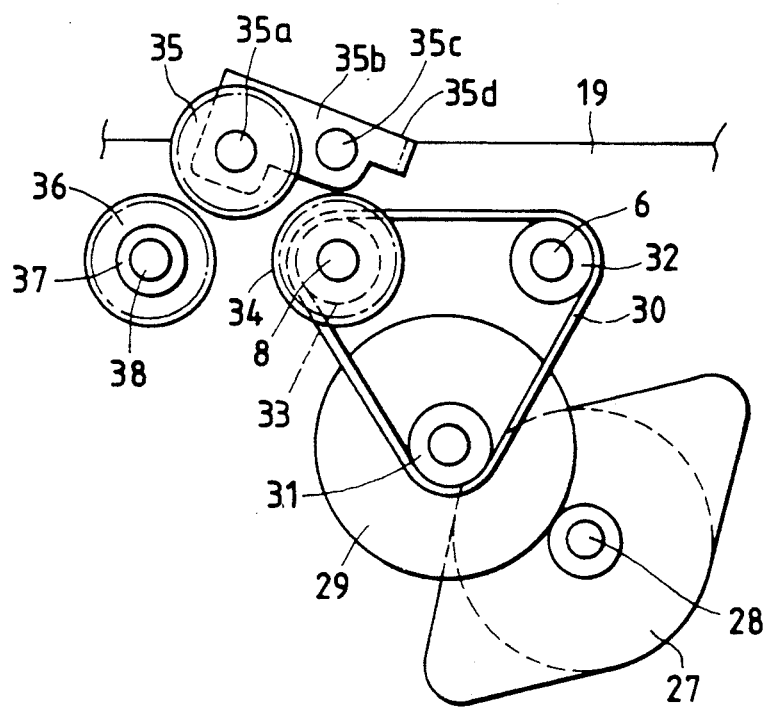

FIG. 16 is a view corresponding to FIG. 15, in which, an arrangement in the sheet original mode is shown. A bent portion 35d of the idler plate 35b is pushed downward by the guide unit 29 shown in FIG. 1, and the idler gear 35 is disengaged from the gears 34 and 36. Therefore, a driving force of the motor 27 is not transmitted to the takeup shaft 38.

Figure 17:
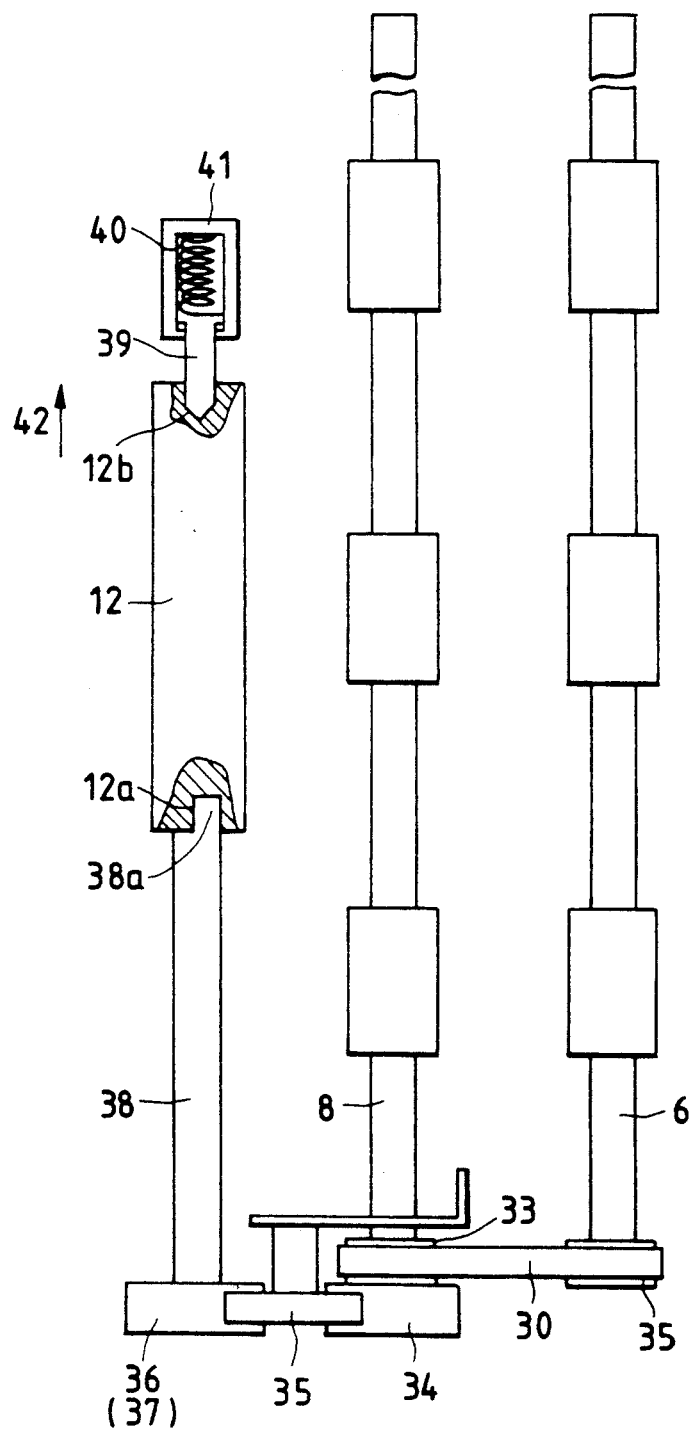
FIG. 17 is a plan view of a drive rollers of the driving system shown in FIGS. 15 and 16.

FIG. 17 is a plan view showing an arrangement of drive rollers of the carrying sheet driving system. In the cubic original mode, a driving force transmitted from the motor 27 to the shaft of the torque limiter 37 is transmitted to the takeup shaft 38 via the torque limiter 37. The other end of the takeup shaft 38 is notched to have a D-shaped section. This D-cut portion 38a is formed to be fitted in a D-shaped hole 12a at the end portion of the takeup roller 12. Therefore, when the D-cut portion 38a is fitted in the D-shaped hole 12a, a driving force of the takeup shaft 38 is transmitted to the takeup roller 12.

A round hole 12b is formed in the end opposite to the D-shaped hole 12a of the takeup roller 12. On the apparatus main body, a support pin 39 to be fitted in the hole 12b is biased in the axial direction toward the round hole 12b by a compression coil spring 40 arranged in a housing 41. Therefore, the takeup roller 12 can be easily mounted on the apparatus main body by fitting the support pin 39 in the round hole 12b and pushing the takeup roller 12 in a direction indicated by an arrow 42 so that the D-cut portion 38a of the takeup shaft 38 is fitted in the D-shaped hole 12a at the opposite side. In addition, the takeup roller 12 can be easily removed from the apparatus main body in an order opposite to that described above. Therefore, replacement of the takeup roller 12, i.e., replacement of the carrying sheet 10 can be easily performed.

When the carrying sheet 10 is, e.g., damaged, it is replaced as follows. That is, after the takeup roller 12 is removed from the apparatus main body, the support member 10c is removed from the handle 10a, and an assembly including a new carrying sheet 10, takeup roller 12, and support member 10c is prepared. As shown in FIG. 11, the support member 10c is engaged with the handle 10a, and then the takeup roller 12 is mounted on the apparatus main body.

Figure 18:
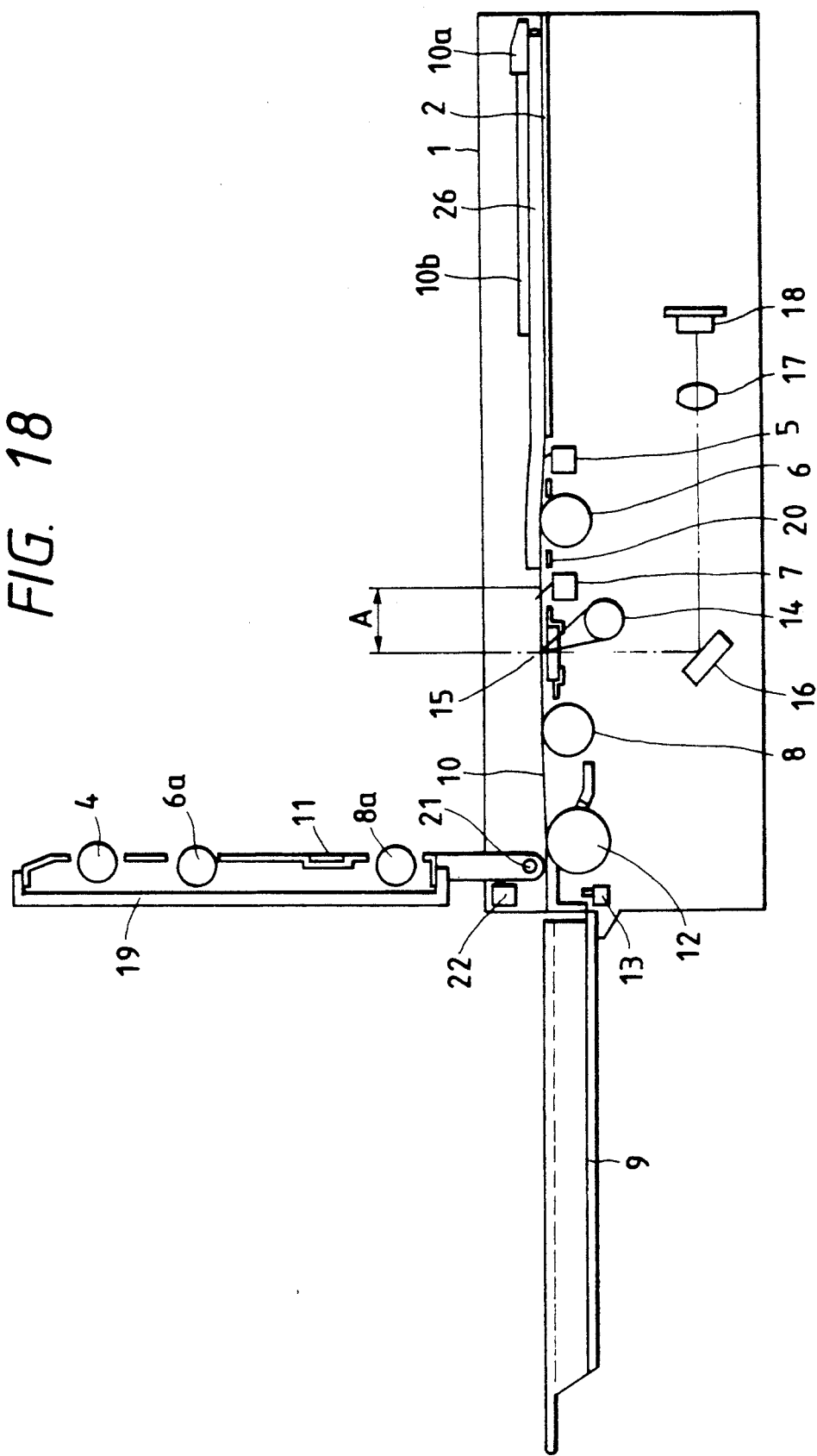
FIG. 18 is a view for explaining a start state of a book original read.

FIG. 18 shows a state in which the cubic original 26 is set, i.e., a reading start state of the cubic original 26. In this case, when an operator operates a start key on the operation unit 44, the cubic original 26 clamped by the carrying sheet 10 is carried, and its original image is read. FIG. 8 is a flow chart for explaining a read operation. When the read operation is started, a state of the micro switch 22 is checked. In this case, since the guide unit 19 is open, the micro switch 22 is ON. Therefore, the cubic original mode is started (step 101 in FIG. 6).

In this case, as shown in FIG. 14, the micro switches 5 and 7 are arranged outside an edge of the carrying sheet 10 and inside an expected minimum original width. Therefore, the position of the cubic original 26 can be accurately detected without interference from the carrying sheet 10.

Figure 19:
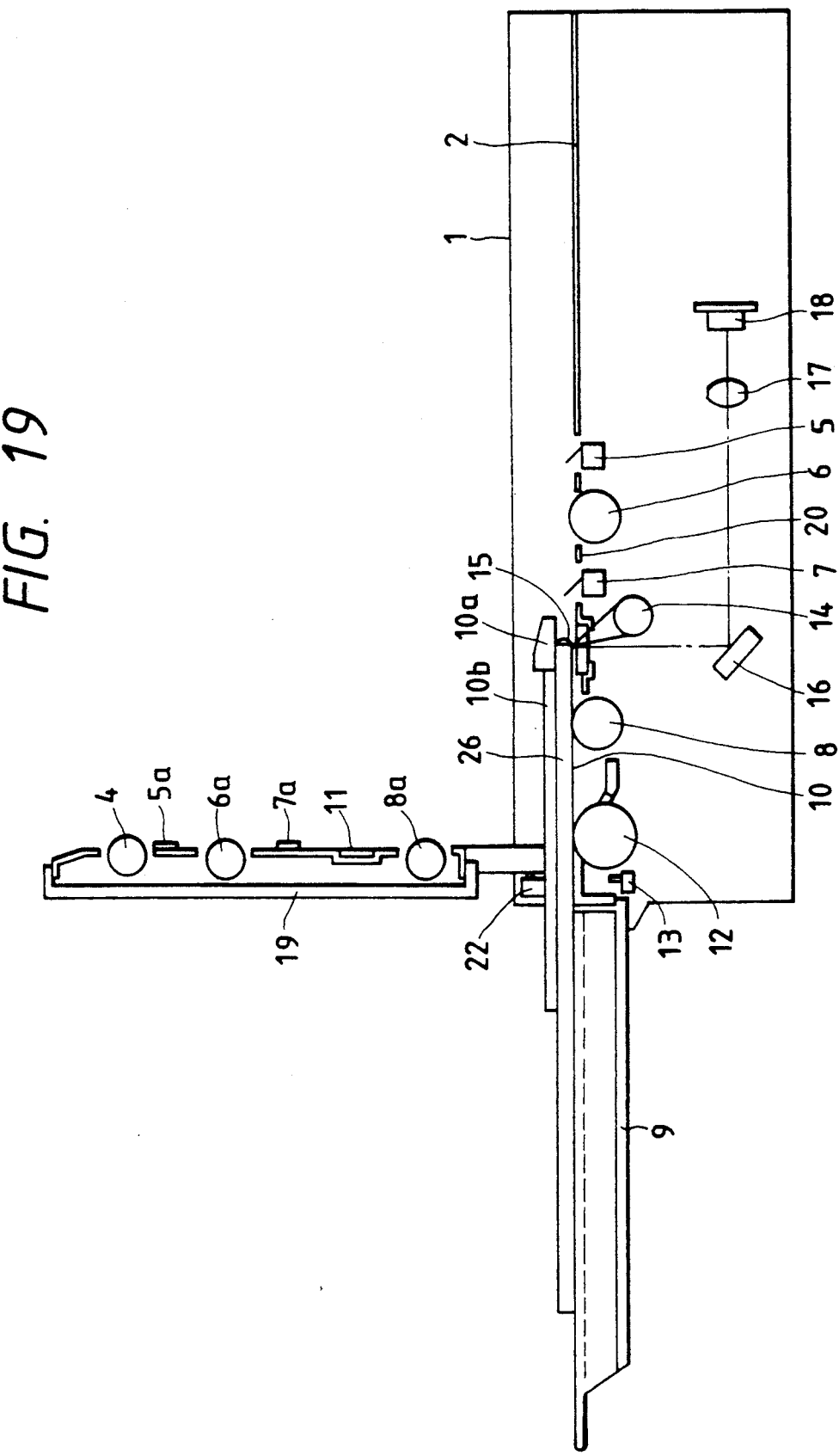
FIG. 19 is a view for explaining an end state of the above operation.

When the cubic original mode is started as described above, the motor 27 is driven to take up the carrying sheet 10 until the micro switch 7 is turned on (step 301 in FIG. 8). When the micro switch 7 detects the cubic original 26, SA step driving of the motor 27 is performed to carry the cubic original 26 by the distance A (see FIG. 18) from the micro switch 7 to the reading position 15 in step 302. In step 303, reading of an original image is performed. When this read operation is ended, a re-operation of the start key is waited for (step 304). FIG. 19 is a view corresponding to FIG. 18, in which a read operation end state of the above cubic original is shown.

In this case, if the carrying sheet 10 is to be extracted in order to start a second image read operation or to open the cubic original 26 subjected to the read operation, it can be easily extracted because the handle 10a is located before the normal standby position (see FIG. 2).

In order to start the second read operation (YES in step 304), the carrying sheet 10 is extracted by operating the handle 10a, a desired cubic original 26 is set, and the start key is re-operated. As a result, the operation is repeated in the above order to read an original image. In order to end the read operation, the cubic original 26 is removed from the carrying sheet 10, and the stop button on the operation unit 44 is depressed (step 305). As a result, the micro switch 13 is turned on (step 306), the motor 27 is driven until the micro switch 13 detects that the carrying sheet 10 returns to its standby position, and the operation in the cubic original mode is ended. Since reading in the sheet original mode is normally frequently performed, however, "close guide unit" or the like is displayed on the display of the display unit 45 (step 307) until the micro switch 22 is turned on (step 308). A series of operations are thus ended. At this time, the carrying sheet 10 returns to its standby position shown in FIG. 1. Therefore, if reading of the sheet original 23 is performed next, jamming does not occur.

In addition, as shown in FIG. 16, the idler gear 35 of the carrying sheet driving system is disengaged from the gears 34 and 36. Therefore, a load on the motor 27 is reduced when the sheet original 23 is carried. In this case, if the idler gear 35 is kept meshed with the gears 34 and 36, in addition to a load produced by carrying the sheet original 23, a transmission torque of the torque limiter 37 is applied on the motor 27. Therefore, a motor having a higher output is required.

Shading correction in this embodiment will be described below.

If a light amount distribution of the light source 14 for illuminating an original image, a transmission light amount of the lens 17, or the sensitivity of the photo-electric conversion element 18 is nonuniform, outputs from the respective light-receiving elements of the photo-electric conversion element 18 with respect to the same density sometimes become nonuniform. Shading correction is a process for electrically correcting this nonuniformity.

As described above, light emitted from the light source 14 illuminates an original placed on the reading position 15, and light reflected from the original is received by the photo-electric conversion element 18 via the optical system including the lens 17 and the mirror 16.

The white reference plate 11 is a white reflecting plate. As shown in FIG. 1, when the carrying path 3 is closed for reading a sheet original, the white reference plate 11 overlaps the reading position 15.

This white reference plate 11 is read by the photo-electric conversion element before reading an original, thereby detecting non-uniformity caused by a shading distortion of read data. Upon original reading, an image signal is corrected on the basis of the detected nonuniformity.

When, however, the carrying path 3 is opened as shown in FIG. 2 in order to read a book original, the white reference plate 11 is no longer present in a position corresponding to the reading position 15. Therefore, the white reference plate 11 cannot be read by the photo-electric conversion element 18. When the carrying path 3 is opened, therefore, it is assumed that the same shading distortion as in a previous original reading is produced in this original reading, and a shading distortion correction operation is performed on the basis of the nonuniformity detected in the previous reading.

That is, as described above, the shading distortion is produced by nonuniformity of the light amount distribution of the light source 14, that of the transmission qualities of the lens, or that of the sensitivity of the photo-electric conversion element, and the values of these factors usually do not change rapidly. Therefore, even if the white reference plate 11 cannot be read, a satisfactory correction result can be obtained by performing the correction operation by using the shading distortion measured beforehand. In this manner, good shading correction can be performed even in book original reading.

Figure 20:
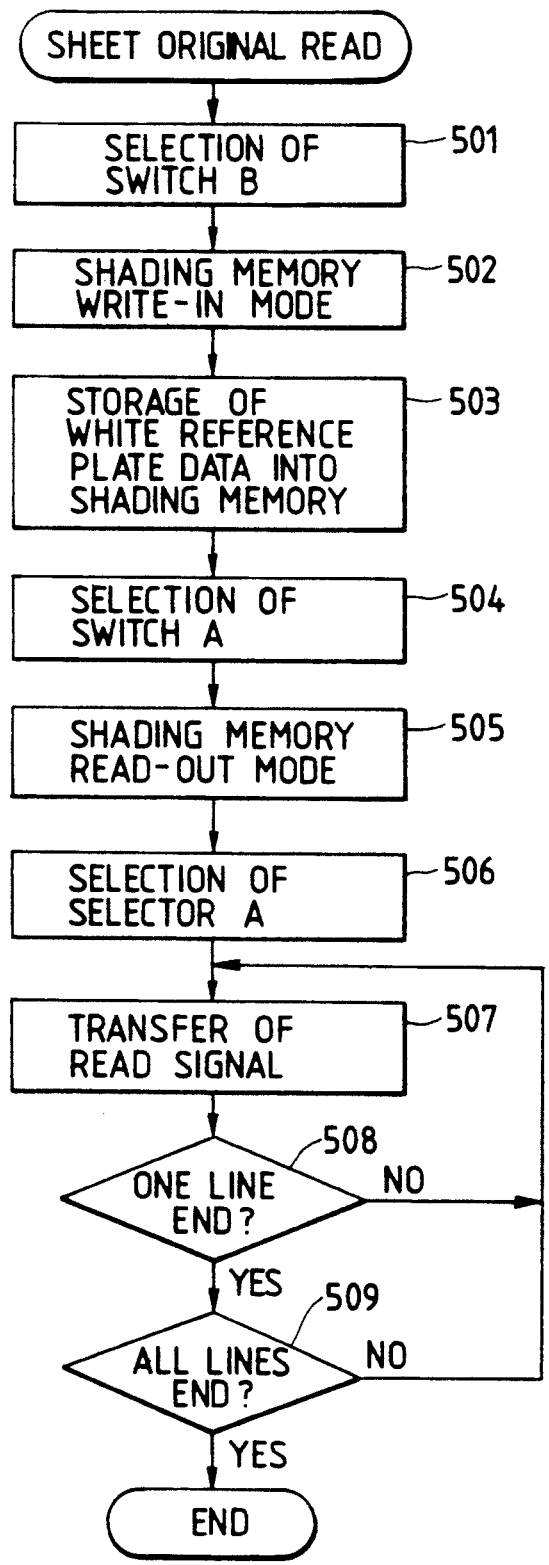
FIG. 20 is a flow chart of an operation procedure of the sheet original mode.

FIG. 20 shows an operation procedure performed by the CPU 43 in the sheet original mode in the image processing unit 46 shown in FIG. 5.

If the CPU 43 determines that the sheet original mode read operation is set in accordance with the procedure shown in FIG. 6, measurement of a shading distortion is performed prior to reading of a sheet original. That is, the switch circuit 404 is set to B (step 501), and the shading memory 405 is set in a write-in mode (step 502). An image signal obtained by reading the white reference plate 11 using photo-electric conversion element 400 is stored in the shading memory 405 (step 503).

In order to read the sheet original image carried to the reading position 15, the switch circuit 404 is set to A (step 504), the shading memory 405 is set in a read-out mode (step 505), and the selector 410 is set to A (step 506). A read signal of the sheet original image supplied from the photo-electric conversion element 400 is binary encoded while it is subjected to shading correction and transmitted to the transmission/recording unit 409 (step 507).

The CPU 43 checks whether the transfer of a binary image signal for one line has ended (step 508). If transfer has not ended, transfer of the binary image signal has continued. If transfer of one line is ended, the CPU 43 checks whether the transfer of binary image signals for all lines (one screen) has ended (step 509). If transfer of all the lines has not ended yet, image transfer of the next line is executed. If transfer of all the lines has ended, reading of the sheet original is ended.

As described above, in the sheet original mode, read processing is performed for a sheet original image, and a binary image signal obtained by the processing is transmitted or recorded.

Figure 21:
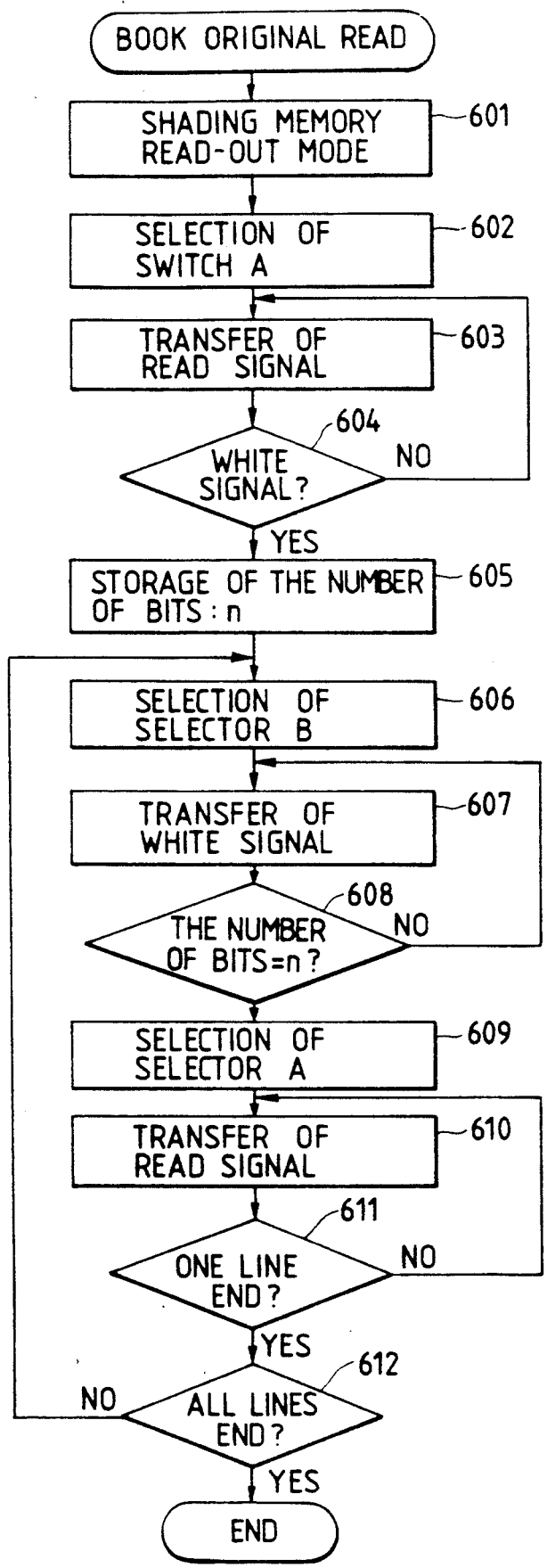
FIG. 21 is a flow chart of an operation procedure of the book original mode.

FIG. 21 shows an operation procedure performed by the CPU 43 in the book original mode.

If the CPU 43 determines that the book original mode read operation is set in accordance with the procedure shown in FIG. 6, the shading memory 405 is set in the read-out mode (step 601). That is, as described above, since reading of the white reference plate 11 cannot be performed in the book original mode, a shading distortion cannot be measured. Therefore, a signal stored in the shading memory 405 upon previous reading is used to perform shading correction.

The switch circuit 404 is set to A (step 602), and the end position of a book original carried to the reading position 15 is detected. That is, the CPU 43 checks whether a binary image signal supplied from the binary encoding circuit 407 is a white or black signal (step 604), and the number of bits obtained until a white signal is generated is counted and stored (step 605). That is, in the book original mode, the guide unit 19 is open, and the white reference plate 11 which is present at the reading position 15 in the sheet original mode is not present. Therefore, in the book original mode, if an original is not present in the reading position 15, light from the light source 14 is not reflected at the reading position 15 but directly transmitted upward. Therefore, no light is incident on the photo-electric conversion element 18. As a result, when an original is not present in the reading position 15, a black signal is output from the photo-electric conversion element 18. If an original is present in the reading position 15 and the original is a white original, a white signal is output from the photo-electric conversion element 18 in correspondence with the original, and a black signal is output therefrom in correspondence with the other portion of the original. Therefore, since an end portion of a normal book original is white, by counting the number of bits n obtained until the photo-electric conversion element 18 outputs the white signal, the end position of the book original carried to the reading position 15 can be recognized.

The set 410 is selected to B (step 606), the white signal from the white signal generating circuit 411 is transferred (step 607), and the black signals generated until the original end is recognized as described above are converted into white signals and transferred. If the CPU 43 determines the count of the number of bits n corresponding to the end position of the book original (step 608), the selector 410 is set to A (step 609), and transfer of a binary signal obtained by shading-correcting and then binary-encoding an image signal read from the book original by the photo-electric conversion element 400 is executed.

The CPU 43 checks whether transfer of an image signal of one line is ended (step 611). If transfer is not ended, transfer of the image signal is continued. If transfer is ended, the CPU 43 checks whether transfer of image signals of all lines (one pixel) is ended (step 612). If transfer is not ended, the set 410 is selected to B again to output a white signal, and output and transfer of image signals of the next line are repeatedly performed.

If transfer of image signals of one screen has ended, reading in the book original mode is ended.

As described above, in the book original mode, measurement of a shading distortion using the white reference plate 11 cannot be performed. Therefore, a shading correction signal obtained upon previous reading is used to perform the shading correction operation, and a black signal generated at an original end is converted into a white signal.

In the above embodiment, in the book original mode, in order to convert the black signal generated at the original end into the white signal, the original end is detected on the basis of the output signal from the photo-electric conversion element 400, and conversion is performed on the basis of the detection result. If, however, an original is black or reflection of an original is close to that of black, the above detection cannot be performed.

Figure 22:
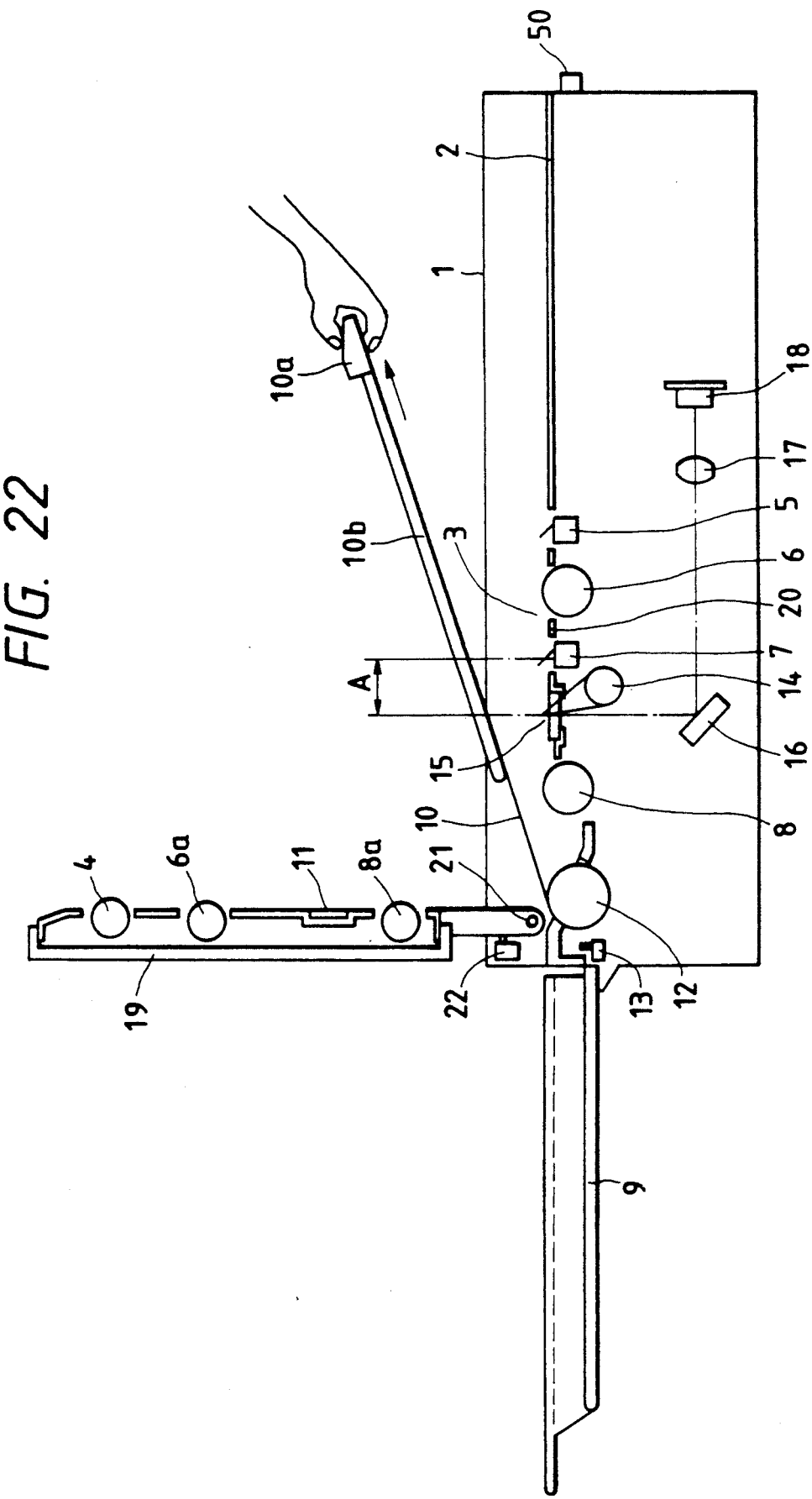
FIG. 22 is a view of another arrangement.

In this case, therefore, a slide switch 50 for setting an end position of a book original to be read in the book original mode is provided as shown in FIG. 22, and conversion from a black to white signal is performed in accordance with setting of this slide switch.

Figure 23:
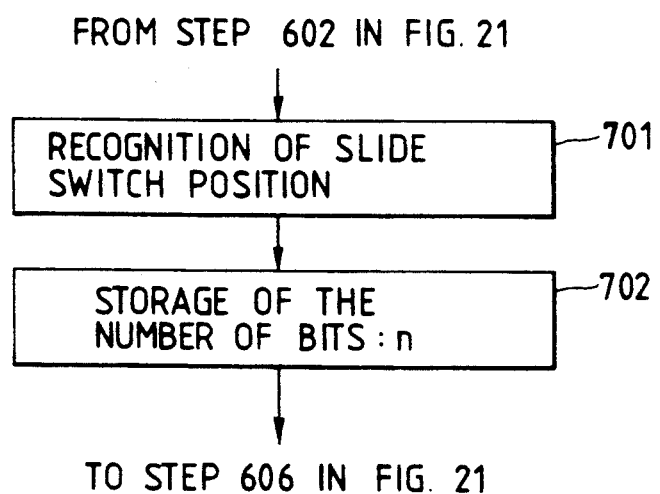
FIG. 23 is a flow chart of a modification of the book original mode operation procedure.

FIG. 23 shows a part of an operation procedure performed by the CPU 43 in the book original mode when the slide switch 50 is provided as shown in FIG. 22 and corresponds to steps 603, 604, and 605 in the operation procedure shown in FIG. 21.

That is, an end position of a book original set by the slide switch 50 is recognized (step 701), and the number of bits n corresponding to the recognized position is stored (step 702).

The above operation is executed in place of steps 603, 604, and 605 shown in FIG. 21, while the other operation is similarly performed as in FIG. 21. In this manner, a black signal generated at the original end set by the slide switch 50 can be converted into a white signal and then transferred.

Note that by using the slide switch 50, an unnecessary portion in an original can be arbitrarily erased and output as a white signal.

In this embodiment, erasure of a black signal generated at one end of an original has been described. However, a black signal generated at the other end of an original can be converted into a white signal.

As described above, since both the sheet and book originals can be read in the above arrangement, a good image read signal can be obtained for either original.

As has been described above, the present invention comprises the carrying rollers 6, 6a, 8, and 8a for carrying a sheet original, the guide unit 19 for urging the carried sheet original at the reading position 15, and the fluorescent lamp 14 and the photo-electric conversion element 18 for reading an image of the sheet original carried to the reading position 15, and is arranged such that nonuniformity of a read signal of the sheet original is corrected on the basis of a read output from the white reference plate 11 provided to the guide unit 19. In addition, an image of a book original can be read with the guide unit 19 open, and correction processing of a read signal obtained upon previous image reading is executed in reading of a book original. Therefore, reading of both sheet and book originals can be performed, and a good read signal whose nonuniformity is corrected can be obtained even when a book original is read.

Furthermore, since a book original can be read with the guide unit 19 open and an unnecessary black signal generated upon reading of a book original is converted into a white signal and then output, a good read signal from which an unnecessary black signal included in a read signal of a book original is removed can be obtained.

The present invention has been described above on the basis of the preferred embodiment. The present invention, however, is not limited to the above embodiment but can be variously modified and changed within the scope of the appended claims.

What is claimed is:

1. An image reading apparatus comprising:
   an original guide member including a reference member, for guiding a sheet original to a reading position, said original guide member being capable of being opened;
   first carrying means for carrying the sheet original to the reading position when said original guide member is in a closed state;
   second carrying means for carrying a book original to the reading position when said original guide member is in an open state;
   reading means for (a) reading an image of the original carried to the reading position by said first or second carrying means, and (b) reading said reference member of said original guide member when said original guide member is in a closed state; and
   correcting means for correcting nonuniformity of a image signal obtained by reading the image of the original on the basis of a reference signal obtained by reading said reference member, when said original guide member is in an open state and said reading means cannot read said reference member said correcting means corrects nonuniformity of the image signal based on the reference signal which was used at the time of reading of an image of a previous original.

2. An apparatus according to claim 1, wherein said correcting means (a) includes memory means for storing the reference signal, and (b) corrects nonuniformity of an image signal on the basis of the stored reference signal.

3. An apparatus according to claim 1, further comprising detecting means for detecting whether said original guide member is open or closed.

4. An apparatus according to claim 3, wherein when said detecting means detects that said original urging member is closed, said correcting means corrects nonuniformity of an image signal on the basis of the reference signal obtained by reading said reference member by said reading means before reading the image of the original.

5. An image reading apparatus comprising:
   an original guide member including a white plate, for guiding a sheet original to a reading position, said original guide member being capable of being opened;
   first carrying means for carrying the sheet original to the reading position when said original guide member is in a closed state;
   second carrying means for carrying a book original to the reading position when said original guide member is in an open state;
   reading means for (a) reading an image of the original carried to the reading position by said first or second carrying means to generate an image signal representing the image, and (b) reading said white plate of said original guide member in a closed state to generate a white signal; and
   converting means for converting a black signal from said reading means to a white signal, when said original guide member is in an open state and said reading means cannot read said white plate, said converting means converts an output signal from said reading means, except the image signal representing the image of the book original, into a white signal.

6. An apparatus according to claim 5, wherein said converting means performs a conversion operation in accordance with a recognition of an end portion of an original.

7. An apparatus according to claim 6, further comprising detecting means for detecting an original end portion.

8. An apparatus according to claim 6, further comprising setting means for setting an original end portion.

9. An apparatus according to claim 5, further comprising detecting means for detecting whether said original guide member is open or closed.

10. An apparatus according to claim 9, wherein when said detecting means detects that said original guide member is opened, said converting means performs a conversion operation.

11. An apparatus according to claim 5, wherein said carrying means is capable of carrying to the reading position not only a sheet original but also a book original, and when the sheet original is carried, said original guide member is closed, and when the book original is carried, said original guide member is opened.

12. An apparatus according to claim 3, wherein when said detecting means detects that said original guide member is open, said correcting means corrects nonuniformity of an image signal on the basis of the reference signal which was used at the time of reading of an image of the previous original.

13. An apparatus according to claim 1, wherein said carrying means is capable of carrying to the reading position no only a sheet original buy also a book original, and when the sheet original is carried, said original guide member is closed, and when the book original is carried, said original guide member is closed.

* * * * *

UNITED STATES PATENT AND TRADEMARK OFFICE
CERTIFICATE OF CORRECTION

PATENT NO. : 5,179,454

DATED : January 12, 1993

INVENTOR(S) : SHINADA

It is certified that error appears in the above-indentified patent and that said Letters Patent is hereby corrected as shown below:

On the title page:

[54] TITLE

"IMAGE READING APPARATUS" should read --IMAGE READING APPARATUS WITH SHADING CORRECTION FOR BOTH SHEET AND BOOK ORIGINALS--.

[56] REFERENCES CITED
FOREIGN PATENT DOCUMENTS

"0174570 9/1985 Japan" should read --60-174570 9/1985--

Insert: --63-60669 3/1988 Japan
63-102556 5/1988 Japan
0027372 8/1981 Euro. Pat. Off.--

COLUMN 1

Line 1, "IMAGE READING APPARATUS" should read --IMAGE READING APPARATUS WITH SHADING CORRECTION FOR BOTH SHEET AND BOOK ORIGINALS--.

COLUMN 2

Line 49, "a" (second occurrence) should be deleted.

UNITED STATES PATENT AND TRADEMARK OFFICE
CERTIFICATE OF CORRECTION

PATENT NO. : 5,179,454
DATED : January 12, 1993
INVENTOR(S) : SHINADA

It is certified that error appears in the above-indentified patent and that said Letters Patent is hereby corrected as shown below:

COLUMN 5

Line 17, "carrying sheet 10 inspection" should read --carrying sheet inspection--.

COLUMN 6

Line 38, delete "sent".

COLUMN 9

Line 50, "has" (second occurrence) should read --is--.
Line 51, "is" should read --has--.

COLUMN 10

Line 32, "selected" should read --set--.
Line 49, "selected" should read --set--.

UNITED STATES PATENT AND TRADEMARK OFFICE
CERTIFICATE OF CORRECTION

PATENT NO. : 5,179,454                    Page 3 of 3
DATED     : January 12, 1993
INVENTOR(S) : SHINADA It is certified that error appears in the above-indentified patent and that said Letters Patent is hereby corrected as shown below:

<u>COLUMN 14</u>

Line 11, "no" should read --not-- and "buy" should read --but--.
   Line 14, "closed." should read --opened--.

Signed and Sealed this

Nineteenth Day of July, 1994

Attest:

BRUCE LEHMAN

*Attesting Officer*        *Commissioner of Patents and Trademarks*